United States Patent Office 3,419,464
Patented Dec. 31, 1968

3,419,464
ADHESION OF POLYESTER TO RUBBER
William D. Timmons, Charlotte, N.C., assignor to Celanese Corporation, a corporation of Delaware
No Drawing. Filed Nov. 12, 1965, Ser. No. 507,586
11 Claims. (Cl. 161—231)

ABSTRACT OF THE DISCLOSURE

A method of adhering polyester materials to rubber comprising coating the polyester with a polyhalogenated aromatic hydrocarbon and applying a conventional adhesive then applying the rubber and curing.

---

The present invention relates to adhering polyester materials, particularly polyester fibrous materials, to rubber. More particularly, the invention relates to applying a polyhalogenated aromatic hydrocarbon such as trichlorobenzene to fibrous materials such as polyethylene terephthalate fibers in order to improve their adhesion to rubber.

In the manufacture of certain rubber goods such as tires, transmission belts and conveyor belts, which are subjected to severe service conditions, it has been found desirable to incorporate fibrous material such as cord, fabrics, and the like with the rubber in order to give added strength to withstand the severe service. Polyester fibers possess properties most desirable as reinforcing materials for rubber, such as excellent tensile strength, shock resistance, stretch resistance, dimensional stability, heat resistance, chemical resistance, imperviousness to water, bacterial resistance and weatherability. However, due to the fact that the molecular structure of polyester fibrous material is inactive, relatively poor adhesion of the polyester fibers to rubber is usually obtained by the conventional adhesion treatments.

Presently, polyester fibers are bonded or adhered to rubber by coating the fibers with an adhesive in a conventional adhesive dipping zone. The coated fibers are subsequently imbedded in rubber and the rubber vulcanized. However, when the resulting polyester-rubber product is subjected to high loads, the polyester fibrous material tends to separate from the rubber causing propagation of tears and general breakdown of the product. For obvious reasons, the problem of adhesion is particularly important in the manufacture of tires.

Accordingly, the primary object of the present invention is to provide a process for the adhesion of polyester materials to elastomers which overcomes the above mentioned disadvantages.

Another object is to provide a process for adhering polyester fibrous materials to rubber, especially to elastomeric hydrocarbon polymers, such that the fibrous material will not separate from the rubber when the resulting product is subjected to loads.

Yet another object is to provide an agent for use in conventional polyester adhesive dipping treatments such that the bonding of the polyester to rubber is substantially improved.

A further object is to provide an improved fiber-reinforced rubber composite.

In accordance with the present invention, a polyester material is treated so as to apply thereto a polyhalogenated aromatic hydrocarbon having the following structure:

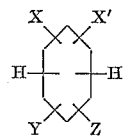

where X and X' are the same or different halogens, where Y is selected from the class consisting of hydrogen, halogen, and lower alkyl ranging from $C_1$ through $C_4$, and where Z is selected from the class consisting of hydrogen and lower alkyl ranging from $C_1$ through $C_4$. An adhesive is also applied to the polyester material. The treated polyester material, which contains the haloaromatic and the adhesive, is then adhered or bonded to rubber, for example, by vulcanization of the rubber.

Any halogen may be used in the above haloaromatic structure. However, the preferred halogens are chlorine and bromine. As can be seen above, the desired aromatic agent contains a minimum of two halogen components, and preferably is a trihalogenated aromatic such as trichlorobenzene, tribromobenzene and trichlorotoluene. Suitable haloaromatics which may be used in the present invention are: ortho-, meta-, and para-dichlorobenzene, the several dibromobenzenes, the several chlorobromobenzenes, the several trichlorobenzenes, tribromobenzenes, the ring chlorinated trichlorotoluenes, dichlorobromotoluenes, and dibromochlorobenzenes, as well as the dichlorotoluenes, the methylethyldichlorobenzenes, and the like.

It has been found that the addition of the haloaromatic to polyester material, particularly polyester fibrous material, substantially improves the adhesion of the material to rubber. However, it should be realized that the use of the haloaromatic does not eliminate conventional adhesive dipping of the polyester material. The haloaromatic is to be used in conjunction with the conventionally used adhesive dipping processes, either as a separate pretreatment step or by including the haloaromatic in the adhesive dip so as to apply concurrently the haloaromatic and the adhesive. It has also been found that the use of the haloaromatic reduces the loss of adhesion which may occur with overcure or extended heating of the adhesive-coated polyester material, thereby permitting a wider range of curing conditions without impairment of product quality.

The term "polyester material" as used herein is meant to include any material in any form, at least a portion of which comprises a fiber forming super polyester. More particularly, the polyesters as used in the invention are the high molecular weight polyesters obtained from $\alpha,\omega$-glycols and dicarboxylic acids, particularly any one of the high molecular weight polyesters obtained from polymethylene glycols and the aromatic dicarboxylic acids. As the most typical of these can be cited polyethylene terephthalate which is obtained from ethylene glycol and terephthalic acid. Preferably, the polyester material is essentially all polyester in the form of cord or fiber. For convenience, the invention as hereinafter discussed is with reference to polyester fibrous material or fibers.

The haloaromatic may be applied to the polyester fibers in any suitable manner. However, it is generally preferred to apply the liquid haloaromatic by dipping the fibrous material, loose or under tension, into a bath of the haloaromatic. The haloaromatic can also be applied by brushing or spraying.

The haloaromatic may be applied using 100% concentration or it may be diluted or dissolved in a solvent such as acetone, propanol and tetrachloroethane or emulsified in water. When a solvent is used the haloaromatic is present in the solvent at a concentration of not less than about 0.1% by volume of the solvent or higher and preferably in the range of from about 0.25 to 5.0%.

As mentioned above, the haloaromatic may be applied to the polyester fibers in a separate pretreatment step or concurrently with the application of the adhesive. The haloaromatic application may be obtained in one dipping or the fibers may be contacted or dipped as many times as desired. Normally, the haloaromatic is applied to the polyester fibers at a temperature in the range of from about 10 to 150° C., and preferably from about 20 to 100° C. However, if the haloaromatic is applied concurrently with the adhesive in the adhesive dipping stage then the temperatures normally used therein are suitable, provided the temperature is below the boiling point of the haloaromatic to avoid its evaporation from the bath. Heat setting the dipped fiber at an elevated temperature, e.g., keeping it at 150° C. to 245° C. for ½ to 5 minutes, can be beneficial. Routine preliminary tests can be used to determine treating conditions that give the best results, it being understood that satisfactory results can be obtained under a wide variety of conditions.

When the haloaromatic is applied to the polyester fibers concurrently with the adhesive in an adhesive dipping stage it is present in the adhesive dip at a concentration in the range of from about 0.1 to 10.0% by volume of the dip solution, and preferably from about 0.25 to 2.0%. When an aqueous adhesive dip is used the haloaromatic may be emulsified therein or the haloaromatic may be dissolved in the dip if the latter comprises a solvent in which the haloaromatic is soluble.

If desired, after pretreating the fibers with haloaromatic and prior to introducing the fibers into an adhesive dipping stage, the fibers, loose or under tension, may be partially or completely dried by being maintained at room temperature for several hours or at an elevated temperature such as 100° C. for a few minutes, such as 2 minutes.

The expression "rubber" as used herein refers to natural and synthetic rubber. Representative synthetic rubbery polymers include the diene polymers. Diene polymers include those polymers having rubber-like properties which are prepared by polymerizing a conjugated $C_4$ to $C_6$ diolefin such as butadiene or isoprene, either along or with one or more other polymerizable ethylenically unsaturated compounds, such as styrene, methyl styrene, and acrylonitrile, the conjugated diolefin usually being present in the mixture to the extent of at least 40% of the total polymerizable material, and preferably in major proportion. The butadiene-styrene copolymers are manufactured commercially under such names as SBR 1000, SBR 1006, SBR 1500 and SBR 1502.

Other synthetic rubbers include the "neoprene" rubbers. "Neoprene" is a generic name which is applied to polymers of chloroprene, and copolymers of chloroprene with dienes or vinyl compounds, in which the chloroprene comprises the predominant monomer. An isobutylene-isoprene copolymer "Butyl" rubber, as well as the elastomeric ethylene-propylene copolymers and tripolymers, may also be used.

The rubber employed may contain customary amounts of various additives such as those needed to effect or accelerate vulcanization. Examples of these materials include sulfur, sulfur chloride, sulfur thiocyanate, thiuram polysulfides and other organic or inorganic polysulfides. These components are preferably employed in amounts varying from about 0.1 part to 10 parts per 100 parts of rubber, and preferably, from about 0.3 to 3 parts per 100 parts of rubber (on a weight basis).

Many other materials may also be included in the rubber composition such as carbon black, pigments, anti-oxidants, anti-scorch agents and the like, all in accordance with practices well known in the art.

With reference to the adhesive, any of the adhesive compositions which are used to bond or adhere polyester fibers to rubber are suitable for use in this invention. Normally, polyester in the form of fibers is dipped into a solution, suspension or emulsion of the adhesive composition, as for example, an aqueous solution containing a water-soluble adhesive. Exemplary water-based adhesives suitable for use herein are resorcinol-formaldehyde precondensates containing isocyanates, blocked isocyanates and epoxy compounds, and aqueous rubber latex dispersions, as well as various combinations of such adhesives which can be applied either in one dip or in a series of dips. The adhesive is usually present in the over-all composition in an amount in the range of from about 1 to 40% by weight. However, higher and lower amounts may be used if desired.

The adhesive is applied to the polyester fibers such that an application of adhesive to the fibers in the range of from about 0.25 to 10.0% by weight of the polyester fibers occurs, and preferably from about 0.5 to 6.0%, for example 4.0%. The adhesive dipping is normally conducted at room temperature, but higher and lower temperatures may be used if desired.

After the polyester fibers have been contacted with the haloaromatic and adhesive, either separately or concurrently, the resulting treated fibers are dried and then cured or heated for a few minutes, for example 1 to 5 minutes at a temperature in the range of from about 60 to 250° C. It is desirable to maintain the fibers under tension during heating in order to avoid shrinkage.

After the haloaromatic and adhesive have been added to the polyester fibrous material it is thereafter adhered to rubber, for example, the polyester fiber is imbedded in vulcanizable rubber and the rubber vulcanized in the conventional manner.

When polyester material is treated in the manner described above a substantially improved adhesion results between the polyester fibers and rubber.

The invention is additionally illustrated by the following examples. The polyester cord used in the following examples was made from two plies of 840 denier high tenacity multifilament yarn twisted 13 turns per inch as singles in the Z direction, and then cabled together 13 turns per inch in the S direction. Further, each of the dip baths were maintained at room temperature.

Example 1

Part A.—A portion of the above polyester cord was treated with a conventional 2-dip adhesive system. First, it was dipped into the following diglycidyl ether composition:

|  | Parts by wt. |
|---|---|
| Water | 97.00 |
| "Epon 812" (a diglycidyl ether of glycerol) | 3.00 |
| Wetting agent such as "Aerosol OT" | 0.17 |
|  | 100.17 |

The cord was removed from dip, dried for 2 minutes 30 seconds at 82° C., and then dipped into the following resorcinol-latex composition:

|  | Parts by wt. |
|---|---|
| Resorcinol | 14.40 |
| Formaldehyde (37%) NNN | 23.20 |
| Water | 399.00 |
| Sodium Hydroxide (50% solids) | 2.53 |
| "Gen Tac" (a butadiene-styrene-vinyl pyridine copolymer latex) (41% solids) | 195.00 |
| "Pliolite 2108" (a styrene-butadiene copolymer latex) (40% solids) | 50.00 |

The cord was removed from the second dip composition, dried for 2 minutes 10 seconds at 99° C., and then heat set for 1 minute 30 seconds at 238° C. The polyester cord was thereafter imbedded in commercial SBR rubber and vulcanized for 25 minutes at about 143° C. After vulcanization U adhesion tests were performed under standard conditions at 121° C., and the U value obtained was 19.9 lbs.

Part B.—Another portion of the polyester cord was introduced into a dip bath comprising 1% by volume of commercial trichlorobenzene in water. The cord was withdrawn from the dip, and dried for 2 minutes 30 seconds at 82° C. The cord was then dipped in a 3% "Epon 812" emulsion as set forth in Part A, removed and dried for 2 minutes and 10 seconds at 99° C. The cord was then dipped in the resorcinol-latex composition set forth in Part A, removed, dried for 2 minutes 10 seconds at 99° C., and heat set for 1 minute 30 seconds at 238° C.

After vulcanization of the cord in commercial SBR rubber, the U adhesion tests at 121° C. gave a U value of 26.2 lbs.

Example II

Part A.—Still another portion of the cord was dipped in the following one-dip adhesive composition:

| | Parts by wt. |
|---|---|
| Water | 299.00 |
| Resorcinol | 7.20 |
| NaOH | 1.27 |
| Formaldehyde | 10.65 |
| "Gen Tac" (a butadiene-styrene-vinyl pyridine copolymer latex) (41% solids) | 200.00 |
| "Pliolite 2108" (a styrene-butadiene copolymer latex) (40% solids) | 50.00 |
| "N–3" (a reaction product of resorcinol, triallylcyanurate and formaldehyde) | 137.00 |
| | 705.12 |

The cord was removed, dried for 2 minutes 10 seconds at 82° C., and then heat set for 1 minute 30 seconds at 238° C. A U adhesion test at 121° C. give a U value of 20.3 lbs.

Part B.—To the composition set forth in Part A of this example was added 1% by volume of trichlororobenzene. A portion of the polyester cord was dipped in this bath, removed, dried for 2 minutes 10 seconds at 82° C., and then heat set for 1 minute 30 seconds at 238° C. After vulcanization of the cord in commercial SBR rubber, the U adhesion test at 121° C. gave a U value of 22.8 lbs.

As can be seen from the above examples, improved adhesion of the polyester fiber to rubber is obtained by applying the haloaromatic to the polyester fiber either before or during application of the adhesive composition to the fiber.

The principle, preferred embodiments, and mode of operation of the invention have been explained and described in the foregoing specification. However, it should be understood that the invention which is intended to be protected herein may be practiced otherwise than as specifically illustrated and described without departing from the scope of the appended claims.

What is claimed is:
1. A process for adhering fiber forming linear polyester materials to an uncured hydrocarbon rubber, which comprises applying to said polyester material a haloaromatic having the following structure

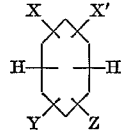

where X and X' are a halogen, where Y is selected from the class consisting of hydrogen, halogen, and lower alkyl ranging from $C_1$ through $C_4$ and where Z is selected from the class consisting of hydrogen and lower alkyl ranging from $C_1$ through $C_4$, also applying an adhesive suitable for adhering polyester fiber to rubber to said polyester material, and thereafter adhering the resulting treated polyester material to rubber and curing.

2. The process of claim 1 wherein the haloaromatic is trichlorobenzene.

3. The process of claim 1 wherein the polyester is polyethylene terephthalic and the haloaromatic is applied to the polyester material by contacting said material with the haloaromatic at a temperature in the range of from about 10 to 150° C.

4. The process of claim 1 wherein the haloaromatic is applied to the polyester material prior to applying the adhesive to said polyester material.

5. The process of claim 1 wherein the adhesive comprises an aqueous dispersion containing a rubbery butadiene copolymer.

6. The process of claim 1 wherein the adhesive comprises a reaction product of resorcinol and formaldehyde.

7. The process of claim 1 wherein the haloaromatic and the adhesive are applied concurrently to the polyester material.

8. The process of claim 1 wherein the halomatic and adhesive are applied to the polyester material by dipping the polyester material into the respective agents.

9. The process of claim 1 wherein the resulting treated polyester material is adhered to a vulcanizable rubber composition by imbedding the polyester material in said rubber composition and thereafter vulcanizing it.

10. A laminated structure comprising linear polyester fibrous material and rubber, said polyester fibrous material having been treated with an adhesive suitable for adhering polyester fiber to rubber and a haloaromatic having the following structure:

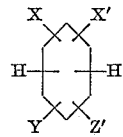

where X and X' are a halogen, where Y is selected from the class consisting of hydrogen, halogen, and lower alkyl ranging from $C_1$ through $C_4$ and where Z is selected from the class consisting of hydrogen and lower alkyl ranging from $C_1$ through $C_4$, to improve the adhesion of the polyester to the rubber.

11. A structure according to claim 10 wherein the rubber is a hydrocarbon copolymer and the haloaromatic is trichlorobenzene.

References Cited

UNITED STATES PATENTS

| 2,990,313 | 6/1961 | Knowles et al. | 161—241 XR |
| 3,308,007 | 3/1967 | Shepard | 161—241 XR |
| 3,318,750 | 5/1967 | Aitken. | |

EARL M. BERGERT, Primary Examiner.

W. E. HOAG, Assistant Examiner.

U.S. Cl. X.R.

117—76; 156—110, 314; 161—241, 248, 255, 257

UNITED STATES PATENT OFFICE
CERTIFICATE OF CORRECTION

Patent No. 3,419,464                                  December 31, 196:

William D. Timmons

It is certified that error appears in the above identified patent and that said Letters Patent are hereby corrected as shown below:

Column 6, lines 40 to 45, the formula should appear as shown below:

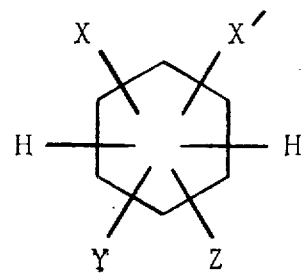

Signed and sealed this 17th day of March 1970.

(SEAL)
Attest:

EDWARD M. FLETCHER, JR.                       WILLIAM E. SCHUYLER, JF
Attesting Officer                                        Commissioner of Patents